United States Patent
Matsuo

(10) Patent No.: US 9,218,553 B2
(45) Date of Patent: Dec. 22, 2015

(54) IMAGE FORMING APPARATUS REPRODUCING GRADATION BASED ON HUE INSTEAD OF LUMINANCE, AND IMAGE FORMING METHOD

(71) Applicant: Kyocera Document Solutions Inc., Osaka (JP)

(72) Inventor: Masaru Matsuo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/496,145

(22) Filed: Sep. 25, 2014

(65) Prior Publication Data

US 2015/0085321 A1    Mar. 26, 2015

(30) Foreign Application Priority Data

Sep. 26, 2013  (JP) ................. 2013-200627

(51) Int. Cl.
*H04N 1/00*   (2006.01)
*G06K 15/02*  (2006.01)

(52) U.S. Cl.
CPC ............ *G06K 15/188* (2013.01); *G06K 15/027* (2013.01)

(58) Field of Classification Search
None
See application file for complete search history.

(56) References Cited

U.S. PATENT DOCUMENTS

| 4,996,591 | A  * | 2/1991 | Kadowaki et al. ............ 358/519 |
| 5,296,920 | A  * | 3/1994 | Sakaue et al. ................. 348/675 |
| 6,449,060 | B1 * | 9/2002 | Kawai et al. ................... 358/1.9 |
| 7,729,025 | B2 * | 6/2010 | Eguchi et al. ................. 358/539 |
| 7,884,965 | B2 * | 2/2011 | Yoshida ......................... 358/1.9 |
| 8,724,894 | B1 * | 5/2014 | Jensen et al. .................. 382/162 |

FOREIGN PATENT DOCUMENTS

| JP | 2004-206426 A | 7/2004 |
| JP | 2005-131258 A | 5/2005 |

* cited by examiner

*Primary Examiner* — Steven Kau
(74) *Attorney, Agent, or Firm* — James W. Judge

(57) ABSTRACT

An image forming apparatus includes a luminance information acquiring unit, a hue information substituting unit, and a color conversion unit. The luminance information acquiring unit is configured to acquire input luminance information of inputted multi-gradation monochromatic image data. The hue information substituting unit is configured to substitute the acquired input luminance information with hue information to generate hue data. The color conversion unit is configured to convert the hue data into a color space for printing to generate multi-gradation color image data.

4 Claims, 10 Drawing Sheets

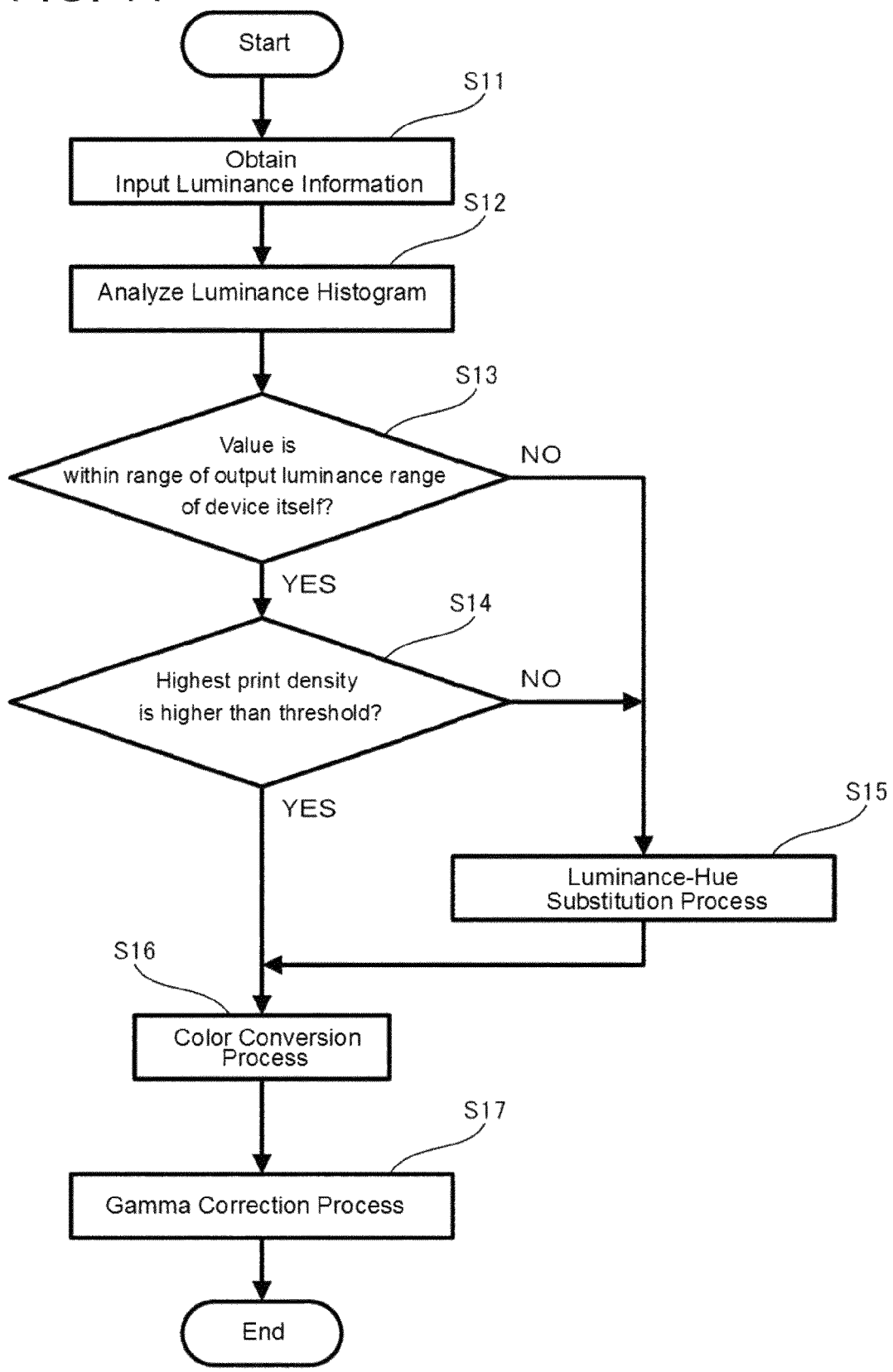

ously in multi-gradation monochromatic image forming apparatuses.

IMAGE FORMING APPARATUS REPRODUCING GRADATION BASED ON HUE INSTEAD OF LUMINANCE, AND IMAGE FORMING METHOD

CROSS-REFERENCE TO RELATED APPLICATION

This application is based upon, and claims the benefit of priority from, corresponding Japanese Patent Application No. 2013-200627 filed in the Japan Patent Office on Sep. 26, 2013, the entire contents of which are incorporated herein by reference.

BACKGROUND

Unless otherwise indicated herein, the description in this section is not prior art to the claims in this application and is not admitted to be prior art by inclusion in this section.

In medical fields, a multi-gradation monochromatic image is used for medical diagnostic purposes, and the multi-gradation monochromatic image is generated by an image generating apparatus for medical use such as Computed Tomography (CT), Magnetic Resonance Imaging (MRI), Computed Radiography (CR), Flat Panel Detector (FPD), and an ultrasonic diagnostic equipment or similar.

When utilizing the multi-gradation monochromatic image, for example, displaying the multi-gradation monochromatic image in a display device such as Cathode Ray Tube (CRT), or printing the displayed multi-gradation monochromatic image on a paper sheet by an output device such as printers, are performed.

In this use of the multi-gradation monochromatic image, because of such purpose, it is important to maintain gradation reproducibility in the display device and the output device.

Especially, the output device such as the printers is likely to change in a characteristic of each portion by secular changes, and therefore, maintaining the gradation reproducibility is performed by a calibration generally.

However, when the characteristic of each portion of the output device significantly changes, maintaining the gradation reproducibility even with the calibration becomes difficult and a reproducible gradation range (number of gradation levels) may decrease. In this case, the detection of such as a tumor, which has been detectable, may also not be able to be performed because a gradation outside the reduced gradation range cannot be accurately reproduced on the paper sheet.

The gradation range reproducible on the paper sheet is lower than that of an image display device of an information processor. Accordingly, similarly to the above-described, the multi-gradation monochromatic image might not be able to be accurately reproduced on the paper sheet even if the gradation reproducibility of the output device is maintained by the calibration.

On the other hand, recently, there has been an increase in cases of employing the various models available from a plurality of manufacturers as the output device of a medical image forming system. The gradation reproducibility may differ among such different output devices.

Accordingly, the gradation might be inconsistently reproduced depending on the output device even if the identical multi-gradation monochromatic image is provided.

In response to this, there is a known technique to ensure consistency in visibility among the devices by defining a contrast sensitivity of a grayscale image with using Grayscale Standard Display Function (GSDF) in the standard of Digital Imaging and Communications in Medicine (DICOM).

In this known technique, the visibility among the output devices can be controlled by adjusting a luminance range. However, adjusting it to the lower degree of the luminance range may cause the deterioration of the gradation reproducibility in some output devices.

There is a method for enhancing a gradation degree in some optical density regions. This case may cause loss of an image total balance, and the deterioration of the gradation reproducibility may occur.

SUMMARY

An image forming apparatus according to an embodiment of the present disclosure includes a luminance information acquiring unit, a hue information substituting unit, and a color conversion unit. The luminance information acquiring unit acquires input luminance information of inputted multi-gradation monochromatic image data. The hue information substituting unit substitutes the acquired input luminance information with hue information to generate hue data. The color conversion unit converts the hue data into a color space for printing to generate multi-gradation color image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 11 is a flowchart of an image processing including a luminance-hue substitution process by the image forming apparatus.

DETAILED DESCRIPTION

Figure 1:
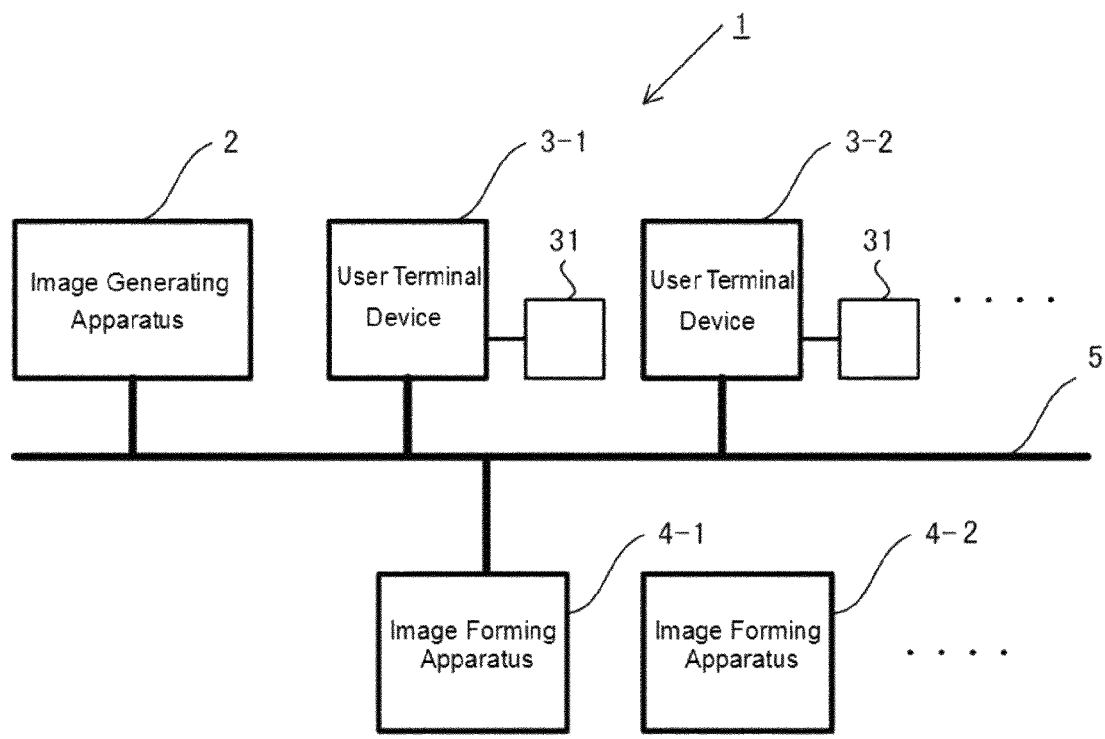
FIG. 1 is a schematic diagram illustrating a configuration of an image forming system including an image processing apparatus according to an embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The object to improve gradation reproducibility when printing started from multi-gradation monochromatic image data is achieved by an image processing apparatus configured as follows. The image processing apparatus substitutes input luminance information of the inputted multi-gradation monochromatic image data with hue information to generate a hue data, and subsequently converts the hue data into a color space for printing to generate multi-gradation color image data.

The substitution of the input luminance information with the hue information is performed where an input luminance range of the multi-gradation monochromatic image data exceeds a reproducible output luminance range in an output unit that performs an output by printing.

Specifically, assigning a reproducible output color in the output unit with respect to the input luminance range and substituting the input luminance information with the hue information where the input luminance range exceeds the output luminance range.

Such image processing apparatus is applicable to a printer or a digital multi-functional peripheral or similar, which are capable of outputting by color printing, and an information processor such as personal computers that performs a print instruction to the above-described printers or digital multi-functional peripheral as well.

FIG. 1 illustrates a block configuration of an image forming system including the image processing apparatus according to the embodiment of the disclosure.

An image forming system 1 according to the embodiment is configured as a medical image forming system. The image forming system 1 includes the followings that are each connected via a network 5 such as the Internet or LAN as illustrated in FIG. 1: an image generating apparatus 2; user terminal devices 3-1, 3-2, . . . , (hereinafter "user terminal devices 3-1, 3-2, . . . " may be referred to as a user terminal device 3); and an image forming apparatus 4-1, 4-2, . . . , as the image processing apparatus (hereinafter "image forming apparatus 4-1, 4-2, . . . " may be referred to as the image forming apparatus 4. A system for medical use should not be construed as limiting the image forming system 1, any other system is possible insofar as the system that prints the multi-gradation monochromatic image.

The image generating apparatus 2 is, for example, CT, MRI, CR, FDP, an ultrasonic diagnostic equipment, or similar equipment. The image generating apparatus 2 generates the multi-gradation monochromatic image data (hereinafter referred to as monochrome image data in some cases) being a medical image data, which a plurality of gradations are expressed by a luminance information.

Figure 2:
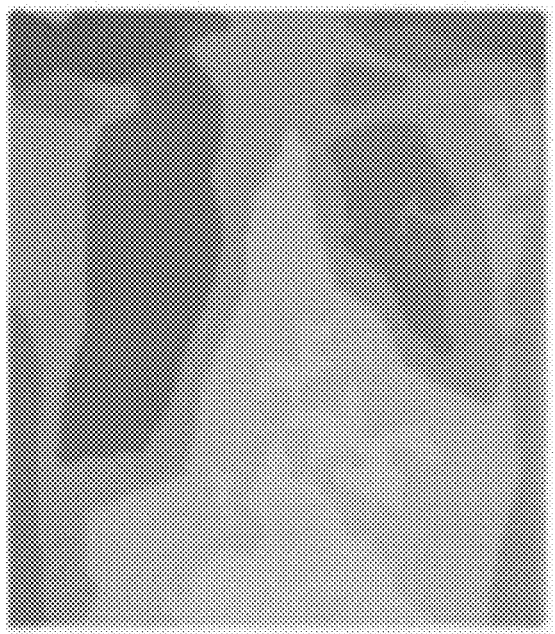
FIG. 2 is a schematic diagram illustrating one example of a multi-gradation monochromatic image displayed on a user terminal device.

The user terminal device 3 is the information processor such as the personal computers. The user terminal device 3 includes a display device 31 such as a monitor or similar. The user terminal device 3 receives the monochrome image data generated by the image generating apparatus 2 to display a monochrome image such as illustrated in FIG. 2 to the display device 31. The user terminal device 3 instructs the image forming apparatus 4 to print as required with respect to the monochrome image displayed in the display device 31.

The image forming apparatus 4 is such as a color printer or a color digital multi-functional peripheral, and outputs by printing the monochrome image on a paper sheet depending on a print instruction from the user terminal device 3. Then, the image forming apparatus 4 can generate the multi-gradation color image data of the color space for printing (hereinafter referred to as color image data in some cases) after converting the luminance information of the multi-gradation monochromatic image data with the hue information as required.

Figure 3:
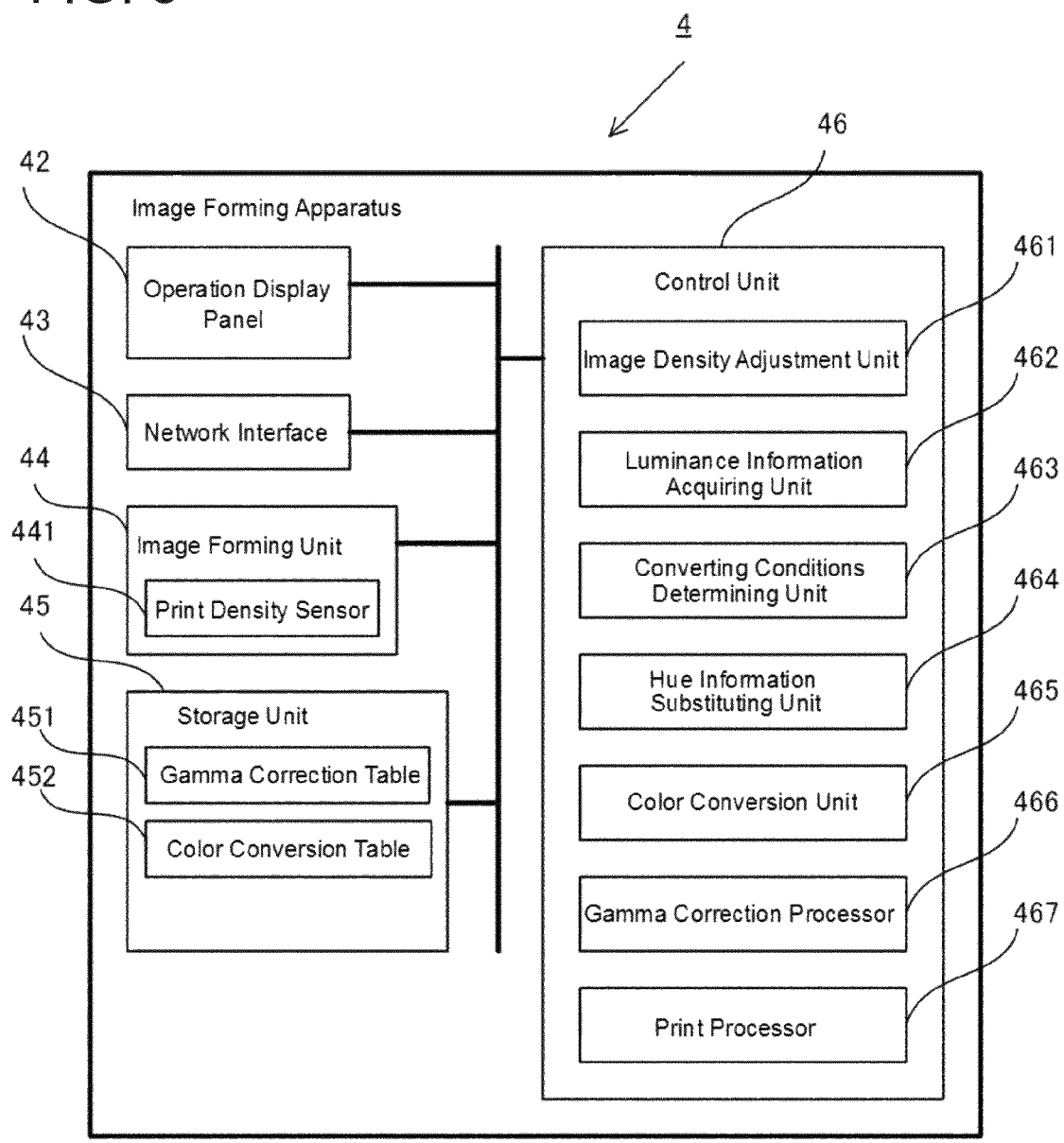
FIG. 3 is a schematic diagram illustrating a block configuration of an image forming apparatus in the image forming system.

FIG. 3 illustrates a configuration of the image forming apparatus 4 in the image forming system in FIG. 1.

The image forming apparatus 4 includes, at least, such as an operation display panel 42, a network interface 43, an image forming unit 44, a storage unit 45, and a control unit 46.

The operation display panel 42 includes a touch-panel liquid crystal display screen or a similar screen. Various input operations to the image forming apparatus 4 are performed from the operation display panel 42, and the operation display panel 42 also displays the input results, or performs a similar operation.

The network interface 43 transmits/receives data to/from external devices including the image generating apparatus 2 or the user terminal device 3 via the network 5.

The image forming unit 44 is the output unit where forming an image on the paper sheet depending on the print instruction to output by printing. The print instruction, for example, is received as a print job from such as the user terminal device 3 via the network interface 43. According to the embodiment, the image forming unit 44 performs to output by printing with respect to the monochrome image data, upon acceptance of the print instruction of the monochrome image data from the user terminal device 3.

The image forming unit 44 overlays toner images corresponding to respective CMYK color spaces of C (cyan), M (magenta), Y (yellow), and K (black), and accordingly enables the printing of a color image or the monochrome image. The CMYK color spaces are the color spaces of a typical color printer. The monochrome image can be also printed with the only one toner image of K (black).

The image forming unit 44 includes a print density sensor 441. The print density sensor 441 is a photo sensor, and detects a print density of a density adjustment image formed by a calibration process (see FIG. 10), which will be described later. The print density detected by the print density sensor 441 is used for generating a gamma correction table that will be described later.

The control unit 46 is an arithmetic device such as a Central Processing Unit (CPU), and performs various processes and controls by executing programs.

The storage unit 45 is such as a Read Only Memory (ROM) that stores the programs, a Random Access Memory (RAM) as a work area, a Hard Disk Drive (HDD) as an auxiliary storage device, or a similar device.

Execution of the programs in the storage unit 45 by the control unit 46 causes the image forming apparatus 4 according to the embodiment to operate as an image density adjustment unit 461, a luminance information acquiring unit 462, a converting conditions determining unit 463, a hue information substituting unit 464, a color conversion unit 465, a gamma correction processor 466, and a print processor 467.

The image density adjustment unit 461 implements the function of an image density adjustment (calibration). For example, the image density adjustment unit 461 performs the calibration for maintaining the gradation reproducibility, upon satisfying certain conditions of environmental variations in such as humidity, temperature, and a number of printed sheets.

Specifically, the image density adjustment unit 461 makes the print density sensor 441 capture the density adjustment images with respective colors to detect the print density, while driving the image forming unit 44 to be formed the density adjustment image corresponding to each color of C, M, Y, and K on the paper sheet. Subsequently, the image density adjustment unit 461 creates a gamma correction table 451 adjusting the print density and stores (updates) it in the storage unit 45 such that the print density of the density adjustment images with the respective colors can be reached at a target print density.

As a result of this calibration, the highest print density of each color of C, M, Y, and K, which is reproducible in the image forming unit 44, and the output luminance range are determined and stored in the storage unit 45. The output luminance range is a value range from the lowest luminance to the highest luminance based on the above-described acquired highest print density.

The luminance information acquiring unit 462 implements the function of acquiring the luminance information. The luminance information acquiring unit 462 acquires the luminance information of the monochrome image data, which is inputted from the user terminal device 3 depending on the print instruction, as the input luminance information. Then, the luminance information acquiring unit 462 also acquires the input luminance range of the monochrome image data based on the input luminance information. The input luminance range is the value range from the lowest luminance to the highest luminance, which is acquirable from a luminance histogram of the monochrome image data.

The converting conditions determining unit 463 implements the function of determining converting conditions. The converting conditions determining unit 463 determines whether substitution conditions for substituting the input luminance information of the inputted monochrome image data with the hue information are satisfied.

The substitution conditions can be set such as a state where the input luminance range of the monochrome image data exceeds the reproducible output luminance range in a device itself, or a state where the highest print density of any one of C, M, Y, and K is lower than a specified print density (threshold). The threshold is specified in a state where the reproducible highest print density in a current setting is lower by a specified value with respect to the highest print density of each color of C, M, Y, and K, which is reproducible in the intended image forming unit 44. The case where the highest print density in the current setting become lower than the threshold includes the cases, for example, where a secular change or similar causes the characteristic of each portion of the image forming apparatus 4 to have been significantly changed.

The hue information substituting unit 464 implements the function of substituting with the hue information. The hue information substituting unit 464 substitutes the input luminance information of the monochrome image data acquired by the luminance information acquiring unit 462 with the hue information to generate the hue data, upon satisfying the above-described substitution conditions.

That is, the hue information substituting unit 464 according to the embodiment substitutes the input luminance information of the monochrome image data with the hue information where the input luminance range of the monochrome image data exceeds the output luminance range. The hue information substituting unit 464 substitutes the input luminance information of the inputted monochrome image data with the hue information where the reproducible maximum density acquired during the calibration process of the image forming unit 44 is lower than the specified threshold as well.

The reproducible output color in the image forming unit 44 is uniformly assigned with respect to the input luminance range of the monochrome image data when performing these substitutions. This substitution process (luminance-hue substitution process) will be described below.

The color conversion unit 465 implements the function of a color conversion. The color conversion unit 465 converts the hue data generated by the hue information substituting unit 464 into a CMYK being the color space for printing to generate the multi-gradation color image data. Corresponding to the medical image data inputted under the print instruction, for example, R (red), G (green), and B (blue) or the color space of CMYK is given to the hue data. The CMYK here is different from the CMYK for printing.

The color conversion unit 465 generates the multi-gradation color image data that is converted into the CMYK of the color space for direct printing with respect to the monochrome image data where not substituting the input luminance information with the hue information in the hue information substituting unit 464.

For a color conversion process, a color conversion table 452, which consists of Color Look-Up Table (cLUT) stored in the storage unit 45, is employed.

The gamma correction processor 466 performs a gamma correction process with respect to the color image data after the color conversion with using the gamma correction table 451 in the storage unit 45.

The print processor 467 makes the image forming unit 44 output by printing based on the color image data after the gamma correction. A screen process or a similar process is performed, followed by the output by printing.

Figure 4:
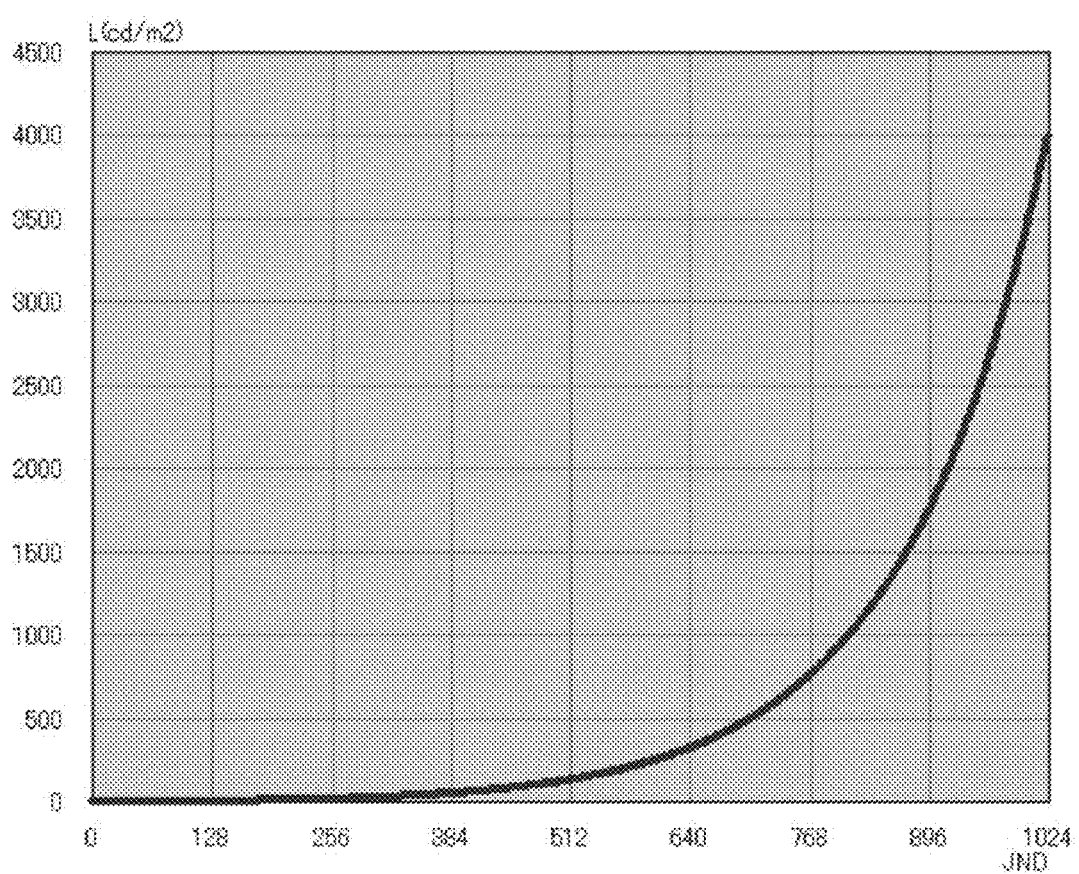
FIG. 4 is a graph of a characteristic of luminance-difference threshold based on a display function in DICOM standard.
Figure 5:
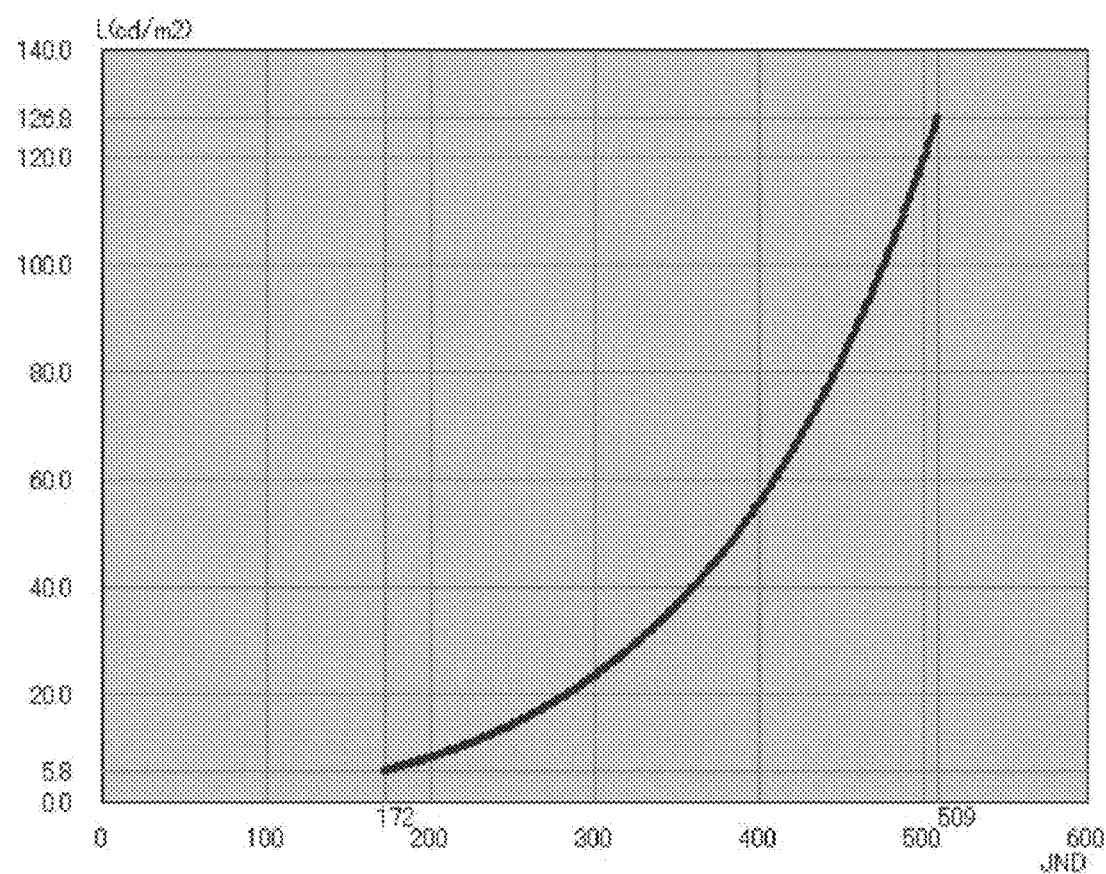
FIG. 5 is a graph of the characteristic of luminance-difference threshold when reproducing a gradation on a paper sheet by the image forming apparatus.

FIG. 4 is a graph of the characteristic of luminance-difference threshold based on a GSDF in DICOM standard. FIG. 5 is a graph of the characteristic of luminance-difference threshold when reproducing the gradation on the paper sheet by the image forming apparatus. In FIG. 4, the values of Just-Noticeable Difference (JND) with respect to a luminance within a luminance range value of 0 to 4500 $cd/m^2$ are plotted. The JDN is a luminance difference of a given target that the average human observer can just perceive, and referred to also a difference threshold.

The user terminal device 3 for medical use typically reproduces the gradation in compliance with the GSDF of FIG. 4 within such as following approximate value rages of: 100 to 200 $cd/m^2$ for a generic image; 200 to 800 $cd/m^2$ for a mammography image; and 300 to 400 $cd/m^2$ for an X-ray image.

By contrast, the output luminance range of 58 to 126.8 $cd/m^2$ depending on the characteristic of FIG. 5, that is, a narrow gradation range (hereinafter referred to as number of gradation levels in some cases) corresponding to the output luminance range, is given to the reproducible gradation on the paper sheet by the image forming apparatus 4.

That is, the gradation of the monochrome image, which has been reproducible in the user terminal device 3, may not be able to be reproduced on the paper sheet, and which causes the deterioration of the gradation reproducibility. Such deterioration of the gradation reproducibility is occurred where such as an aged deterioration of the image forming apparatus 4 causes the output luminance range to become narrow, as well.

As described above, the embodiment is to provide that substituting the input luminance information of the monochrome image data with the hue information ensures the improvement of the gradation reproducibility.

Figure 6:
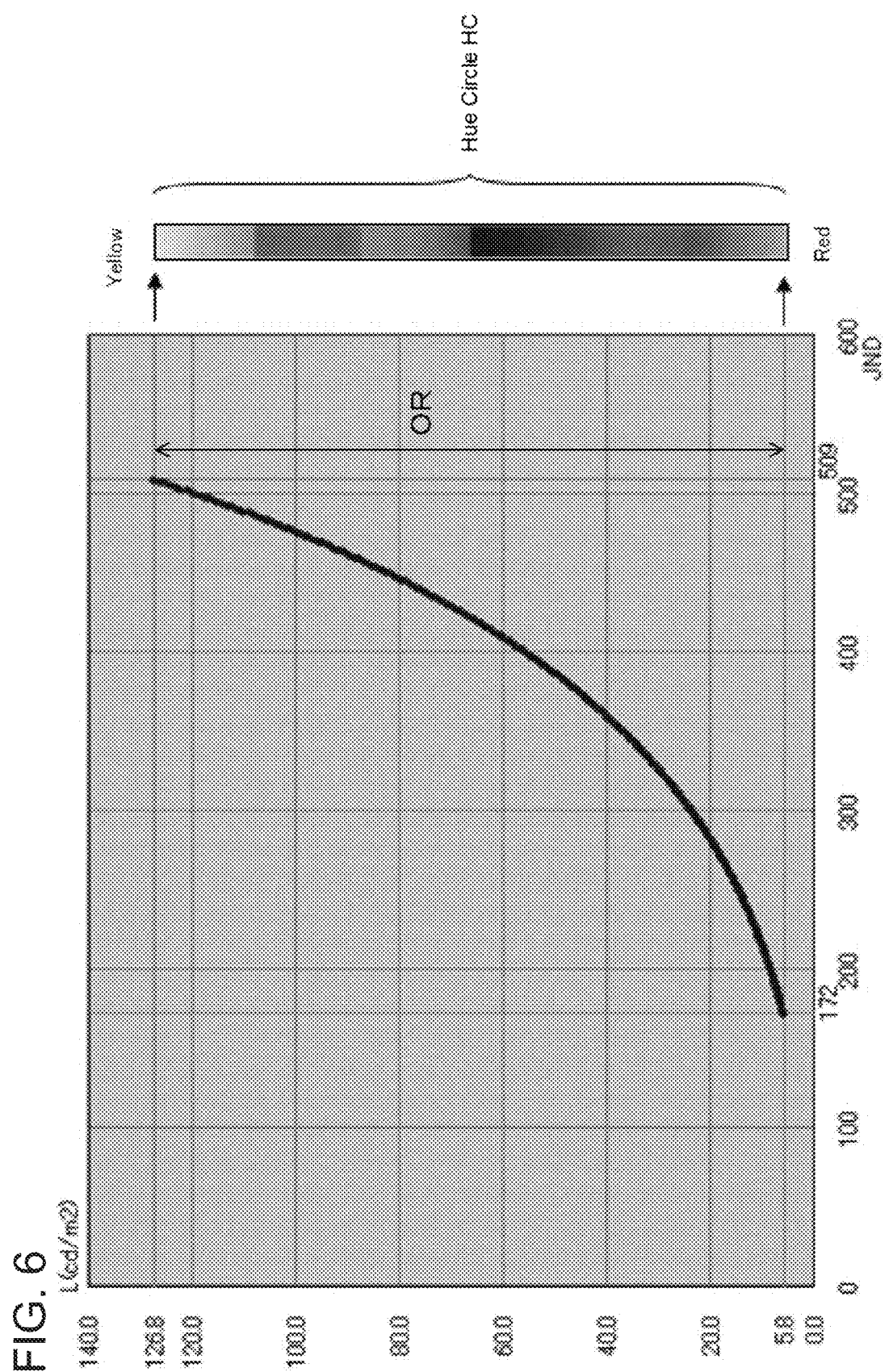
FIG. 6 is a graph of substitution of luminance information with hue information.

FIG. 6 is a graph of substitution of the luminance information with the hue information. In FIG. 6, a hue circle HC of the reproducible output color in the image forming unit 44 is assigned to an output luminance range OR of the characteristic of luminance-difference threshold in FIG. 5.

The gradation of the monochrome image being printed on the paper sheet is normally reproduced within the value range of the gradation range corresponding to the output luminance range of 58 to 126.8 cd/m² illustrated in FIG. 5. The embodiment ensures that this gradation range can expand to the gradation range, which corresponds to the number of the hue (number of colors) of a hue circle HC assigned as illustrated in FIG. 6.

That is, the tone, which is subdivided by a plurality of colors of the hue circle HC, can be formed with respect to each gradation in the output luminance range OR, because the number of the reproducible gradation range (number of colors) depending on the hue exceeds that of the reproducible gradation range depending on the luminance generally.

Figure 7:
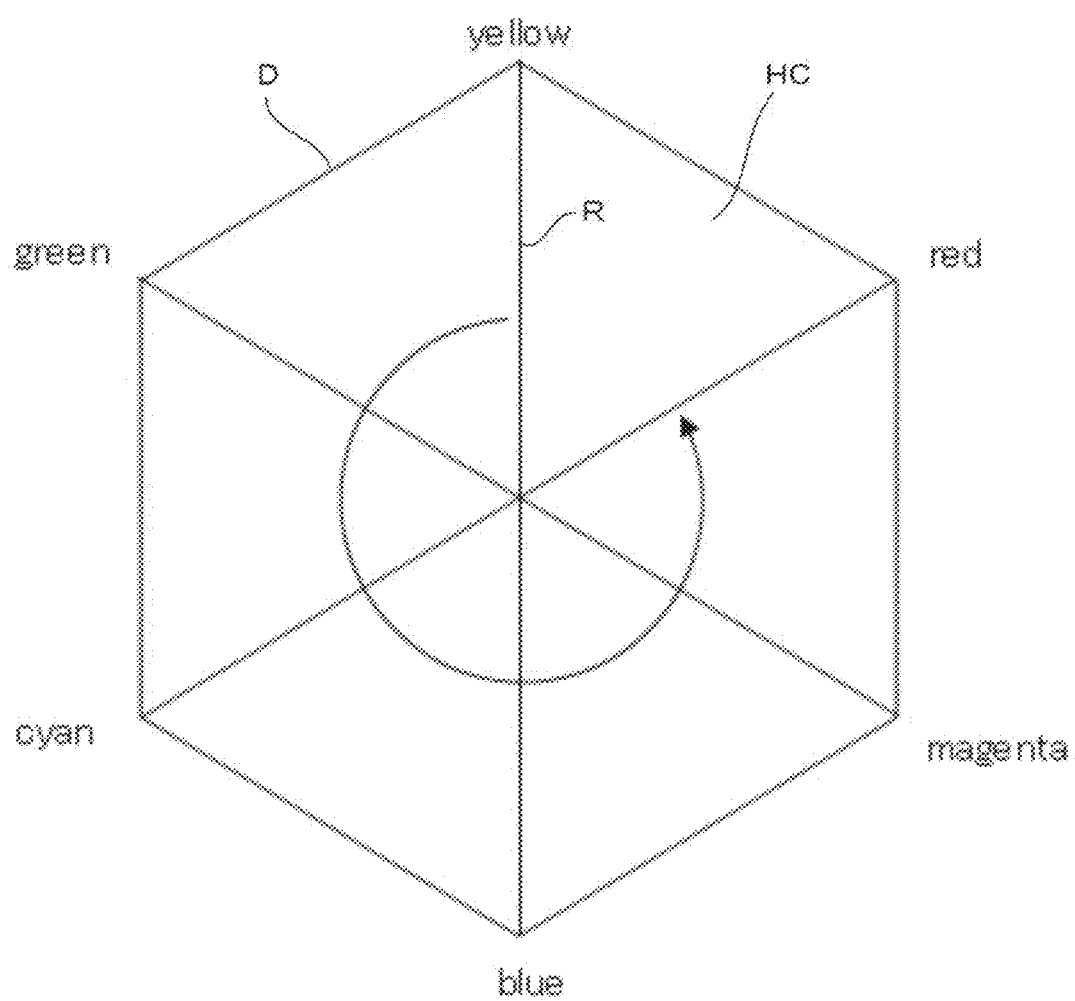
FIG. 7 is a schematic diagram illustrating a reproducible hue circle (color gamut) of an output color in the image forming apparatus with expressing in a CIE-LAB space.

FIG. 7 illustrates the reproducible hue circle (color gamut) of the output color in the image forming apparatus with expressing in a CIE-LAB space. The hue circle HC of this example is based on six hues of Yellow, Green, Cyan, Blue, Magenta, and Red. These six hues are designated as primary six color hues in the embodiment.

In the image forming apparatus 4, the reproducible number of gradation levels by the hue can be calculated by a distance between adjacent hues D. In the example of FIG. 7, the number of gradation levels (number of colors) can be approximated by the following expression (1), because every primary six color hues has an identical saturation (diameter R in the hue circle HC).

$$\text{Number of colors} = \text{saturation}(R) \times 2 \times \pi \tag{1}$$

Figure 8:
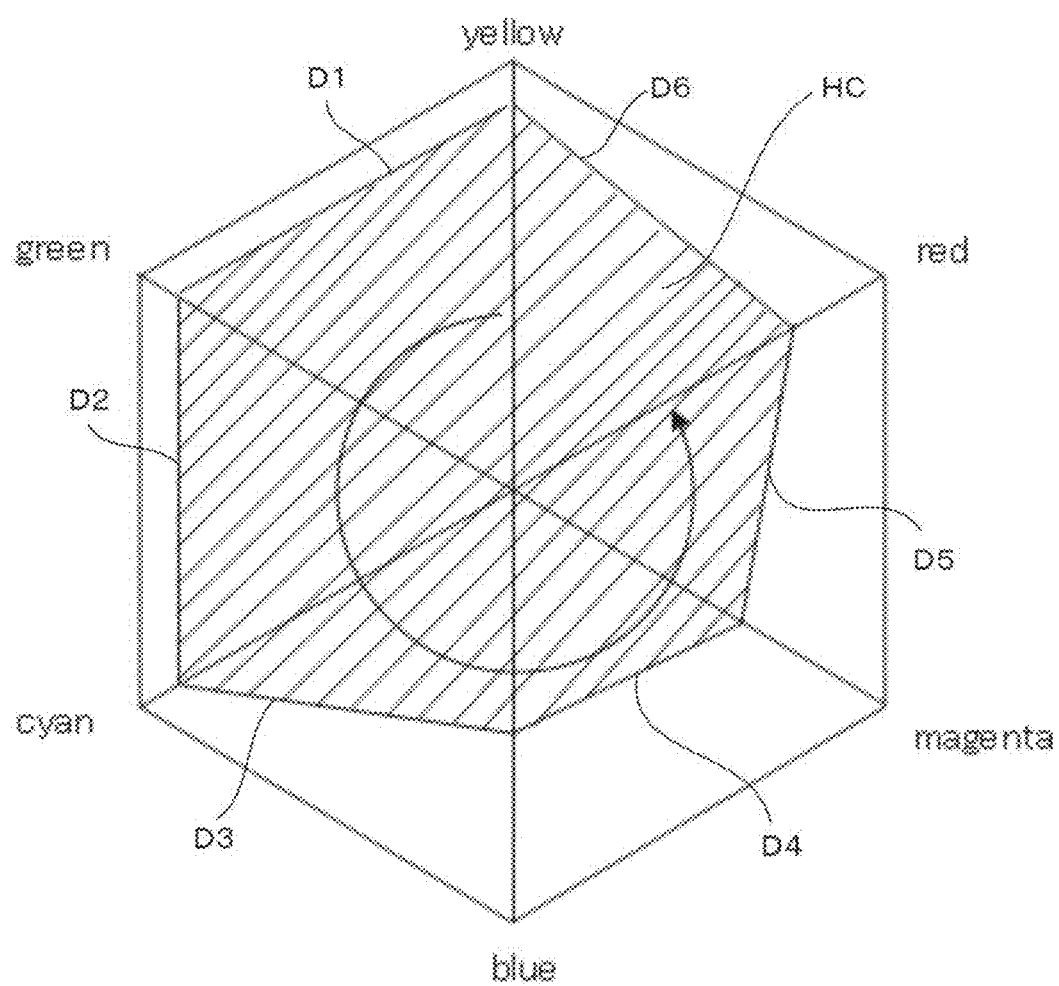
FIG. 8 is a schematic diagram illustrating an actually reproducible hue circle (color gamut) of an output color in the image forming apparatus with expressing in the CIE-LAB space.

In practice, every primary six color hues does not have the identical saturation, as illustrated in FIG. 7, but the saturation of the primary six color hues varies as illustrated in FIG. 8.

Figure 9:
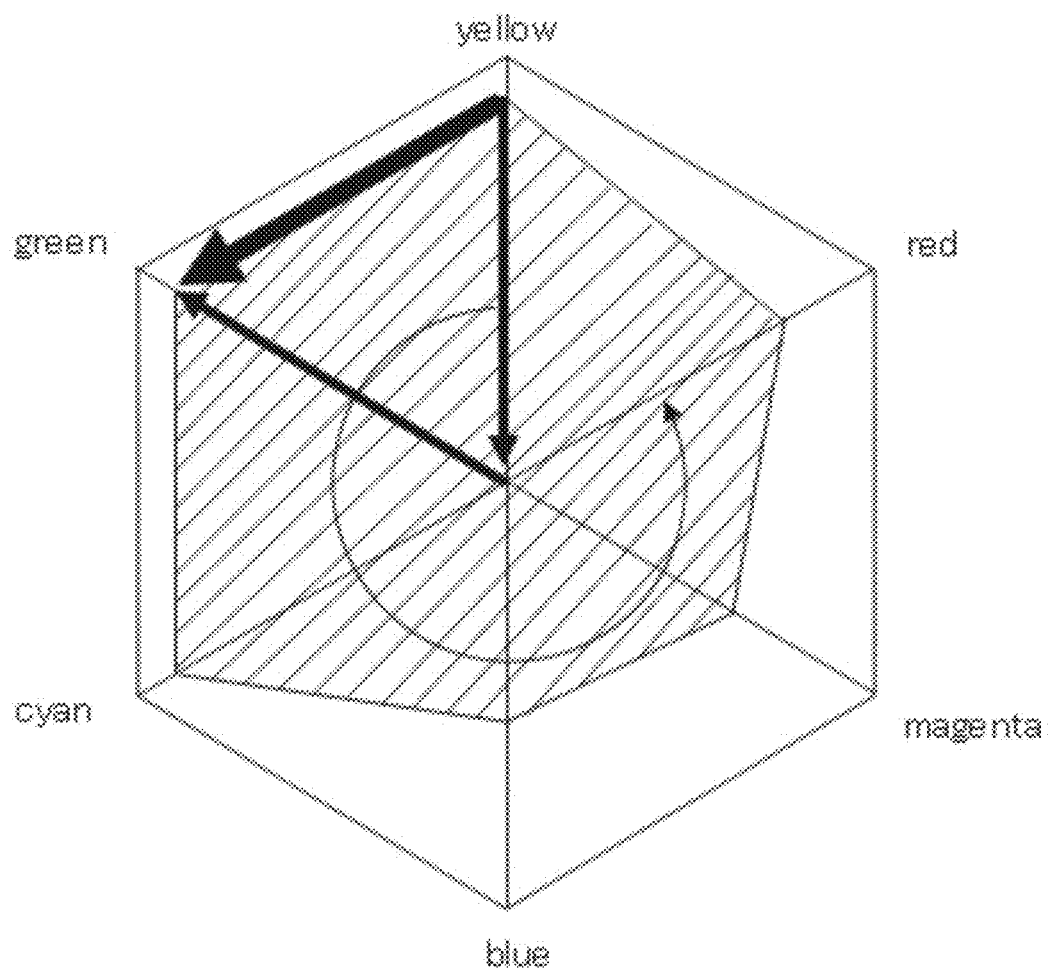
FIG. 9 is a schematic diagram illustrating a calculation method of the number of colors.

FIG. 8 illustrates the practically reproducible hue circle (color gamut) of the output color in the image forming apparatus with expressing in the CIE-LAB space. FIG. 9 illustrates a calculation method of the number of colors in FIG. 8. A diagonally shaded areas in FIG. 8 indicates the color gamut.

In the example of FIG. 8, because the saturation of the primary six color hues varies, a vector length between the hues such as illustrated in FIG. 9 is calculated and added corresponding to the following expression (2). This ensures the reproducible number of gradation levels (number of colors) can be approximated by the hue in the image forming apparatus 4.

$$C_n = D1_{Y\text{-}G} + D2_{G\text{-}C} + D3_{C\text{-}B} + D4_{B\text{-}M} + D5_{M\text{-}R} + D6_{R\text{-}Y} \tag{2};$$

wherein: $C_n$ is number of colors; $D1_{Y\text{-}G}$ is vector distance between yellow and green (not including green itself); $D2_{G\text{-}C}$ is vector distance between green and cyan (not including cyan itself); $D3_{C\text{-}B}$ is vector distance between cyan and blue (not including blue itself); $D4_{B\text{-}M}$ is vector distance between blue and magenta (not including magenta itself); $D5_{M\text{-}R}$ is vector distance between magenta and red (not including red itself); and $D6_{R\text{-}Y}$ is vector distance between red and yellow (not including yellow itself). This formula is also expressed as follows.

Number of Colors=(Vector Distance $D1$ between Yellow and Green (not include Green in itself))+(Vector Distance $D2$ between Green and Cyan (not include Cyan in itself))+(Vector Distance $D3$ between Cyan and Blue (not include Blue in itself))+(Vector Distance $D4$ between Blue and Magenta (not include Magenta in itself))+(Vector Distance $D5$ between Magenta and Red (not include Red in itself))+(Vector Distance $D6$ between Red and Yellow (not include Yellow in itself))

The practically reproducible number of colors in the image forming apparatus 4 can be more accurately calculated where increasing a number of hues setting as basic. For a design of a color conversion table, the number of colors of the hue circle can be approximated by the only management of the above-described expression (1) alone where making each of the primary six color hues has an equal amount of the saturation. Additionally, for the design of the color conversion table, the distance between hues of the primary six color hues may be formed at regular intervals (equal angular intervals).

Thus, the output color, of which corresponds to the quantity calculated as illustrated in FIGS. 7 and 8, is uniformly assigned with respect to the input luminance range of the monochrome image data. As a result of that, as described in FIG. 6, the gradation range corresponding to the output luminance range OR of the monochrome image data can expand to the gradation range corresponding to the hue circle HC. The hue circle HC is assigned in such manner as Yellow, Green, Cyan, Blue, Magenta, and Red in decreasing order of the luminance within the output luminance range OR value of 126.8 to 58 cd/m².

Figure 10:
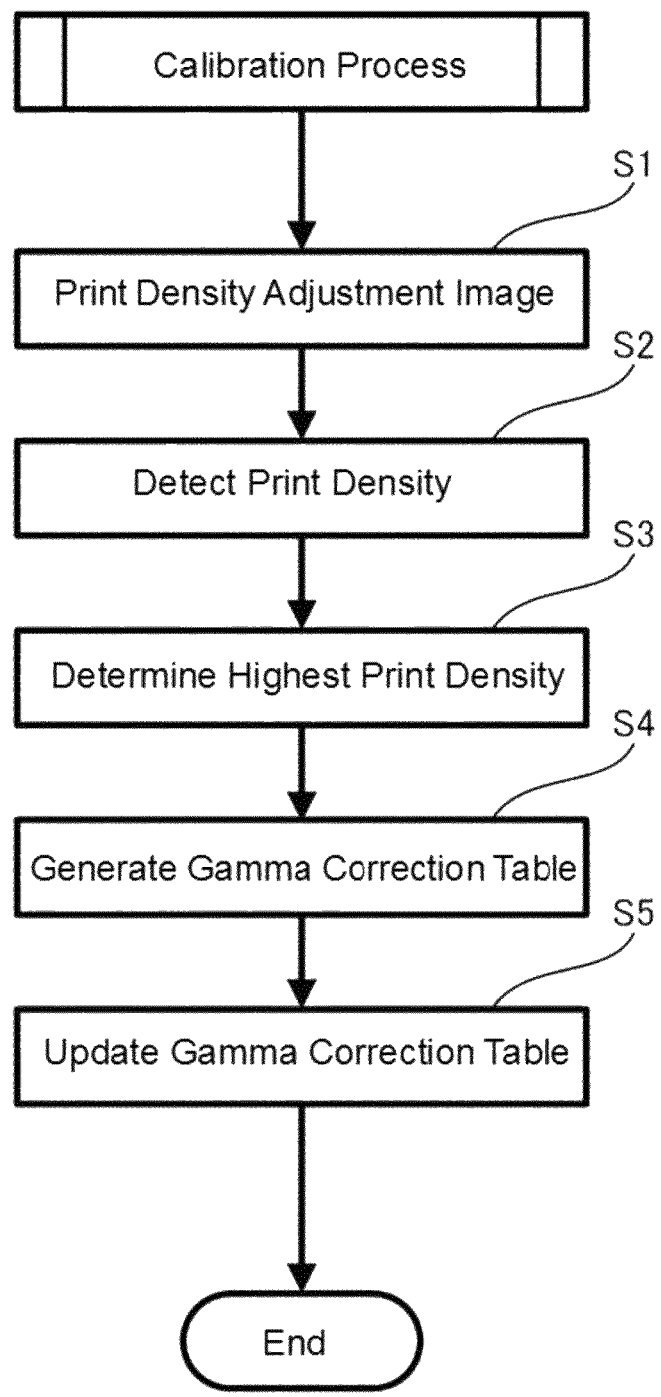
FIG. 10 is a flowchart of a calibration process by the image forming apparatus.

The calibration process and the luminance-hue substitution process, which the image forming apparatus 4 according to the disclosure operates, will be described. FIG. 10 illustrates the calibration process of the image forming apparatus.

The calibration process is initiated from each of the following states where: the image forming apparatus 4 satisfies the certain conditions of such as temperature, humidity, the number of printed sheets, and the continuous printing operation time; or the operation for the instruction of the calibration is performed by a user.

Firstly, in Step S1, Printing Density Adjustment Image is performed upon initiation of the calibration process. In this process, the image density adjustment unit 461 makes the image forming unit 44 output by printing the density adjustment image, which is a selected pattern of each color of C, M, Y, and K, on the paper sheet.

After the process of Step S1 has been completed in this manner, the process proceeds to Step S2.

In Step S2, Detecting Print Density is performed. In this process, the print density of the density adjustment images with the respective colors formed on the paper sheet is detected by the print density sensor 441, and accordingly the image density adjustment unit 461 recognizes the detected print density.

After Step S2 has been completed in this manner, the process proceeds to Step S3.

In Step S3, Determining Highest Print Density is performed.

In this process, the image density adjustment unit 461 determines the highest print density of each color from the recognized print density of the density adjustment images.

After Step S3 has been completed in this manner, the process proceeds to Step S4.

In Step S4, Generating Gamma Correction Table is performed.

In this process, the image density adjustment unit 461 compares the highest print density of each color determined in Step S3 with the target print density that is specified for every color. Subsequently, the image density adjustment unit 461 generates the gamma correction table 451 that enables the print density of each color in a current operating environment to approach or accurately correspond with the target print density (maintaining the gradation reproducibility) based on the comparison result.

After Step S4 has been completed in this manner, the process proceeds to Step S5.

In Step S5, Updating Gamma Correction Table is performed. In this process, the image density adjustment unit 461 stores the gamma correction table 451 generated in Step S4 in the storage unit 45 and updates. Upon completion of this updating process, the calibration process has been completed.

At this time, after the calibration, the highest print density of each color of C, M, Y, and K, which is reproducible in the image forming unit 44, and the output luminance range, which is the value range from the lowest luminance to the highest luminance based on the above-described highest print density, are determined, stored in the storage unit 45, and updated.

FIG. 11 illustrates an image processing including a luminance-hue substitution process in the image forming apparatus 4.

This image processing, for example, starts upon accepting the print instruction of the multi-gradation monochromatic image being displayed on the display device 31 from the user terminal device 3 that displays (monitors) the multi-gradation monochromatic image on the display device 31.

Firstly, in Step S11, Obtaining Input Luminance Information is performed upon initiation of the image processing.

In this process, the luminance information acquiring unit 462 acquires the input luminance information from the monochrome image data, of which the printing instruction is issued by the information processor 3.

After Step S11 has been completed in this manner, the process proceeds to Step S12.

In Step S12, Analyzing Luminance Histogram is performed. In this process, the luminance information acquiring unit 462 generates the luminance histogram based on the input luminance information of the monochrome image data acquired in Step S11. Subsequently, the luminance information acquiring unit 462 acquires the input luminance range that is the value range from the lowest luminance to the highest luminance in the luminance histogram.

After Step S12 has been completed in this manner, the process proceeds to Step S13.

In Step S13, issuing a conditional branch instruction "Value is within range of output luminance range of device itself?" is performed. In this process, the converting conditions determining unit 463 compares the input luminance range of the monochrome image data acquired in Step S12 with the output luminance range of the device itself. Subsequently, the converting conditions determining unit 463 determines whether the input luminance range of the monochrome image data is within the range of the output luminance range of the device itself or not.

Where the input luminance range of the monochrome image data is within the range of the output luminance range of the device itself, the gradation of the monochrome image data inputted in the image forming unit 44 can be reproduced, and which causes the process to proceed to Step S14 (YES).

On the other hand, where the input luminance range is not within the range of the output luminance range, the gradation of the monochrome image data cannot be reproduced in the image forming unit 44, and which cause the process to proceed to Step S15 (NO).

In Step S14, issuing the conditional branch instruction "Highest print density is higher than threshold?" is performed. In this process, the converting conditions determining unit 463 compares the highest print density of each color of C, M, Y, and K, which is stored during the calibration process, with the specified threshold. Subsequently, the converting conditions determining unit 463 determines whether the value of the print density of the above-described stored highest print density is lower than that of the threshold, to which the highest print density of each color corresponds, or not.

Therefore, where the highest print density of at least one color of C, M, Y, and K, is lower than the threshold, this results in the deterioration of the gradation reproducibility even if the gradation of the monochrome image data is reproducible in the image forming unit 44. This accordingly caused that the process proceeds to Step S15 (NO).

On the other hand, where the value of the highest print density of all colors of C, M, Y, and K, is equal to or more than that of the threshold, the gradation of the monochrome image data can be reproduced in the image forming unit 44, and this results in the elimination of the deterioration of the gradation reproducibility. This accordingly caused that the process proceeds to Step S16 (YES).

Steps S13 and S14 can be configured such that only one of the steps is performed.

In Step S15, Luminance-Hue Substitution Process is performed. In this process, the hue information substituting unit 464 substitutes the input luminance information of the monochrome image data acquired by the luminance information acquiring unit 462 with the hue information.

Specifically, as described with reference to FIGS. 7 and 8, the output enable output color in the image forming unit 44, of which corresponds to the value calculated from the hue circle HC, is uniformly assigned with respect to the input luminance range of the medical image data. As a result of that, the hue data, which the input luminance information is substituted with the hue information, is generated.

After Step S15 has been completed in this manner, the process proceeds to Step S16.

In Step S16, Color Conversion Process is performed. That is, where the process proceeded from Step S15, the color conversion unit 465 converts the hue data, which the input luminance information is substituted with the hue information, into the CMYK being the color space for printing in the image forming unit 44 with reference to the color conversion table 452. This ensures that the multi-gradation color image data for printing is generated.

On the other hand, where the process proceeded from Step S14, the medical image data inputted depending on the print instruction is directly converted into the CMYK being the color space for printing in the image forming unit 44. This ensures that the multi-gradation monochromatic image data for printing is generated.

After Step S16 has been completed in this manner, the process proceeds to Step S17.

In Step S17, Gamma Correction Process is performed. In this process, the gamma correction processor 466 performs the gamma correction with respect to the multi-gradation color image data or the multi-gradation monochromatic image data, which are for printing. After the Gamma Correction Process has been completed in this manner, the screen process or a similar process is performed, and then the color image or the monochrome image is outputted by printing on the paper sheet.

Therefore, with the embodiment, outputting as the color image after converting the input luminance information into the hue information enables to be reproducible as the change in hue even if the gradation is provided, which cannot be reproduced on the paper sheet in case of outputting the monochrome image from the multi-gradation monochromatic image data.

In this embodiment, the control unit 46 of the image forming apparatus 4 includes luminance information acquiring unit 462, the hue information substituting unit 464, and the color conversion unit 465. The luminance information acquiring unit 462 is configured to acquire the input luminance information of the medical image data being the inputted multi-gradation monochromatic image data. The hue information substituting unit 464 is configured to substitute the acquired input luminance information with the hue information to generate the hue data. The color conversion unit 465 is configured to convert the hue data into the color space for printing to generate the multi-gradation color image data.

Therefore, with the embodiment, it is possible to reproduce on the paper sheet as the gradation based on the hue of the color image even if the gradation is provided, which cannot be reproduced as the monochrome image on the paper sheet when printing started from the multi-gradation monochromatic image data.

That is, with the embodiment, it is possible to reproduce the gradation based on the hue instead of the luminance on the paper sheet, and the gradation reproducibility can be improved. As a result of that, the color image, which the gradation is accurately reproduced on the paper sheet, enables to contribute such as an accurate diagnosis.

In addition, with the embodiment, the hue information substituting unit 464 substitutes the input luminance information with the hue information where the input luminance range of the monochrome image data exceeds the reproducible output luminance range in the device itself.

Therefore, it is possible to reproduce on the paper sheet as the gradation based on the luminance with printing as the monochrome image as it is where the gradation of the monochrome image data can be reproduced on the paper sheet as the monochrome image in the image forming unit 44. On the other hand, it is possible to reproduce on the paper sheet as the gradation based on the hue with printing as the color image where the gradation of the medical image data cannot be reproduced on the paper sheet as the monochrome image.

In this case, the hue information substituting unit 464 assigns the reproducible output color in the image forming unit 44 with respect to the input luminance range to substitute the input luminance information with the hue information.

Therefore, with the embodiment, it is possible to substitute the input luminance information with the hue information by the reproducible hue in the image forming unit 44 and surely improve the gradation reproducibility.

In addition, with the embodiment, the hue information substituting unit 464 substitutes the input luminance information with the hue information where the reproducible highest print density acquired during the calibration process is lower than the specified threshold.

Thus, with the embodiment, it is possible to surely improve the gradation reproducibility even if the image forming apparatus 4 has the significantly decreased the highest print density, regardless of whether the input luminance range of the monochrome image data exceeds the reproducible output luminance range in the device itself or not.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
a luminance information acquiring unit that acquires input luminance information from input multi-gradation monochromatic image data, and obtains an input luminance range from the input luminance information;
a hue information substituting unit that substitutes the acquired input luminance information with hue information to generate hue data;
a color conversion unit that converts the hue data into a color space for printing to generate multi-gradation color image data; and
an image forming unit that forms printed images from the multi-gradation color image data generated in the color conversion unit, the image forming unit therein having a reproducible output luminance range; wherein
the hue information substituting unit
generates the hue data by uniformly assigning to the input luminance range a number of colors calculated, as the hue information, from a hue circle assigned to output colors, corresponding to the output luminance range, reproducible by the image forming unit, the hue information substituting unit approximating the number of colors $C_n$ as a reproducible number of gradation levels by hue, according to the equation $$C_n = D1_{Y\text{-}G} + D2_{G\text{-}C} + D3_{C\text{-}B} + D4_{B\text{-}M} + D5_{M\text{-}R} + D6_{R\text{-}Y}$$

wherein $D1_{Y\text{-}G}$, $D2_{G\text{-}C}$, $D3_{C\text{-}B}$, $D4_{B\text{-}M}$, $D5_{M\text{-}R}$, and $D6_{R\text{-}Y}$ are respective hue-circle vector distances between yellow and green (not including green itself), green and cyan (not including cyan itself), cyan and blue (not including blue itself), blue and magenta (not including magenta itself), magenta and red (not including red itself), and red and yellow (not including yellow itself), and
substitutes the input luminance information with the hue information if the input luminance range of the multi-gradation monochromatic image data exceeds the reproducible output luminance range of the image forming unit.

2. The image forming apparatus according to claim 1, wherein the hue information substituting unit substitutes the input luminance information with the hue information if maximum reproducible density of any one of cyan, magenta, yellow, and black, acquired during a calibration process for the image forming unit is lower than a specified threshold value with respect to the maximum print density for each of the colors cyan, magenta, yellow, and black reproducible in the image forming unit.

3. An image forming method for an image forming apparatus including an image forming unit having a given reproducible output luminance range, the method comprising:
acquiring input luminance information from input multi-gradation monochromatic image data and obtaining an input luminance range from the input luminance information;
if the input luminance range of the multi-gradation monochromatic image data exceeds the given reproducible output luminance range of the image forming unit, substituting the acquired input luminance information with hue information calculated as a number of colors from a hue circle assigned to output colors corresponding to the output luminance range reproducible by the image forming unit, by approximating the number of colors $C_n$ as a reproducible number of gradation levels by hue, according to the equation $$C_n = D1_{Y\text{-}G} + D2_{G\text{-}C} + D3_{C\text{-}B} + D4_{B\text{-}M} + D5_{M\text{-}R} + D6_{R\text{-}Y}$$

wherein $D1_{Y-G}$, $D2_{G-C}$, $D3_{C-B}$, $D4_{B-M}$, $D5_{M-R}$, and $D6_{R-Y}$ are respective hue-circle vector distances between yellow and green (not including green itself), green and cyan (not including cyan itself), cyan and blue (not including blue itself), blue and magenta (not including magenta itself), magenta and red (not including red itself), and red and yellow (not including yellow itself);

generating hue data by uniformly assigning the calculated number of colors to the input luminance range;

converting the hue data into a color space for printing to generate multi-gradation color image data; and outputting by printing the generated multi-gradation color image data.

4. The image forming method according to claim 3, further comprising:

substituting the input luminance information with the hue information if maximum reproducible density of any one of cyan, magenta, yellow, and black, acquired during a calibration process for the image forming unit is lower than a specified threshold value with respect to the maximum print density for each of the colors cyan, magenta, yellow, and black reproducible in the image forming unit.

\* \* \* \* \*